(12) United States Patent
Guhr et al.

(10) Patent No.: US 6,981,833 B2
(45) Date of Patent: Jan. 3, 2006

(54) WORK VEHICLE WITH DUAL MODE UNLOADER APPARATUS AND METHOD

(75) Inventors: Quentin L. Guhr, East Moline, IL (US); John F. Link, Calumet City, IL (US); Jay D. Schroeder, Coal Valley, IL (US)

(73) Assignee: CNH America LLC, Racine, WI (US)

( * ) Notice: Subject to any disclaimer, the term of this patent is extended or adjusted under 35 U.S.C. 154(b) by 499 days.

(21) Appl. No.: 10/199,819

(22) Filed: Jul. 19, 2002

(65) Prior Publication Data

US 2004/0013506 A1   Jan. 22, 2004

(51) Int. Cl.
*B60P 1/00*   (2006.01)

(52) U.S. Cl. ...................................... 414/312; 414/523

(58) Field of Classification Search .................. 414/26, 414/507, 526, 523, 812; 56/10.2 F, 10.2 H, 56/10.3; 198/657, 312

See application file for complete search history.

(56) References Cited

U.S. PATENT DOCUMENTS

| | | | |
|---|---|---|---|
| 3,638,812 A * | 2/1972 | Ryczek | 414/523 |
| 3,834,564 A | 9/1974 | Laurent et al. | |
| 4,241,566 A | 12/1980 | Webster | |
| 4,459,079 A * | 7/1984 | Brelsford et al. | 414/505 |
| 4,866,920 A | 9/1989 | Kerchhove et al. | |
| 4,888,940 A | 12/1989 | Deutsch | |
| 5,518,453 A | 5/1996 | Tribbett | |
| 5,855,108 A | 1/1999 | Salz et al. | |
| 6,074,298 A | 6/2000 | Majkrzak et al. | |
| 6,233,911 B1 | 5/2001 | Dillon | |
| 6,292,729 B2 * | 9/2001 | Falck et al. | 56/10.2 |
| 6,339,917 B1 | 1/2002 | Dillon et al. | |

* cited by examiner

*Primary Examiner*—James W. Keenan
(74) *Attorney, Agent, or Firm*—Rebecca Henkel (57) ABSTRACT

A work vehicle is provided for conveying an agricultural product via a movable member or tube to an adjacent product receiving bin. The movable member is controllable to swing back and forth accurately over the bin under precise operator control to enable the bin to be "topped off". An auger or other conveyer device is used to feed product into the movable member. The vehicle's control system includes an extend switch and a retract switch which operate in a latched first mode when the conveyer device is not actuated. In the latched first mode, the extend or retract switches are pressed once to start the swinging motion of the movable member and are pressed a second time to stop the swinging motion. However, when the conveyer device is turned on to feed product into the movable member, the vehicle's control system switches to an unlatched second mode. In the unlatched second mode, the operator presses the extend or retract switch and the corresponding swinging motion commences upon such contact. However, the extend or retract motion ceases when the operator ceases contacting the corresponding switch. The unlatched second mode provides the operator with substantially improved control of the back and forth swinging motion of the movable member above the receiving bin when product is flowing through the movable member while the bin is being "topped off".

23 Claims, 5 Drawing Sheets

WORK VEHICLE WITH DUAL MODE UNLOADER APPARATUS AND METHOD

BACKGROUND

The disclosures herein relate generally to combines and more particularly to the grain unloading apparatus of a combine.

Agriculture equipment such as a combine or agricultural vehicle utilizes a head or other implement to perform various operations on a field. Combines often employ an implement such as a harvester or header attached to a feeder to harvest a crop or other plant-related matter. The feeder receives the cut or harvested crop from the header and provides the harvested crop to various pieces of equipment within the combine which perform assorted operations on the harvested crop such as sorting, separating, spreading, storing, or other agricultural functions.

Generally, combines have a combustion engine or mechanical power source indirectly driving the various pieces of equipment which operate on the harvested crop. The various pieces of equipment can include, but are not limited to, a feeder which receives the harvested crop from the header and transports the harvested crop to within the combine, a rotor which receives the harvested crop from the feeder and spins axially to thresh or separate the seed from the non-seed material of the harvested crop, a shoe shaker which separates additional seed from the non-seed material from the rotor, a straw spreader which spins to throw the non-seed material received from the shoe shaker out of the combine, a tailings elevator which conveys seed from the shoe shaker to the rotor, a clean grain elevator which transports seed from the rotor to the grain storage tank or external grain storage area, a discharge beater, a chopper which cuts the non-seed material for spreading by the straw spreader, a cleaning fan which provides cross air movement across the seed material to clean the seed material as it is conveyed through the combine, and a rotary air screen fan which provides cooling for the combustion engine, as well as other types of devices which are driven by the engine.

An unloader apparatus, typically a swingable auger tube, is conventionally stowed alongside the combine in a plane parallel with the combine's wheels. This unloader tube is capable of swinging from the stowed position to a position which is approximately 90 degrees perpendicular to the stowed position. The unloader tube is swung back and forth by the operator over a grain receiving bin in a storage vehicle which is positioned alongside the combine to permit the bin to be "topped off". If the unloader tube were not swingable, the distribution of grain would peak at some areas of the bin and be low in other areas of the bin resulting in the bin not being filled to capacity.

One conventional control mechanism for swinging the unloader tube in and out over the grain receiving bin includes a latching extend switch and a latching retract switch. In this approach, the operator moves the extend switch to a mechanically latched position which causes the unloader tube to swing outwardly. To halt this outward swinging motion, the operator returns the unloader extend switch to the unlatched position. To retract the unloader tube, the operator moves the retract switch to a mechanically latched position which causes the tube to reverse direction and start to move inwardly back toward the stowed position. The tube's inward swinging motion continues until either the retract switch is unlatched by the operator or the tube reaches the stowed position.

In addition to simply swinging the tube in and out from a stowed position to a work position and vice versa, the extend and retract switches are used by the operator to swing the tube back and forth over the grain receiving bin of the storage vehicle to more evenly distribute grain within the bin. In other words, this latching switch mechanism is used to "top off" the bin. While the latching switch mechanism does perform the described function of moving the tube inward and outward, as a practical matter it can be difficult to use this mechanism to effectively "top off" the bin. The problem with such latching systems is that at critical times (i.e., when an operator is trying to "top off" a transportation or storage device) not enough control is available to the operator.

What is needed is an unloading apparatus and method which provides the operator with greater control over the position of the unloading apparatus.

SUMMARY

Accordingly, in one embodiment, a work vehicle is provided including a main body propelled by a power source. The vehicle also includes an unloader member movably mounted to the main body, the unloader member being movable between first and second end positions and to positions therebetween. The vehicle further includes a control system coupled to the unloader member. The control system includes a first control switch exhibiting first and second states. The control system is operative in a latched first mode wherein movement of the unloader member is started in a first direction when the first control switch is placed in the first state a first time, and movement is stopped when the first control switch is placed in the first state a second time. The control system is also operative in an unlatched second mode wherein movement of the unloader member is started when the first control switch is placed in the first state and movement stops when the first control switch is placed in the second state.

A principal advantage of the embodiment disclosed herein is that the operator of the work vehicle is provided with substantially greater control over the swinging motion of the unloader apparatus used to transport grain to the grain receiving bin. This is especially helpful when the bin is being "topped off".

DETAILED DESCRIPTION

Figure 1:
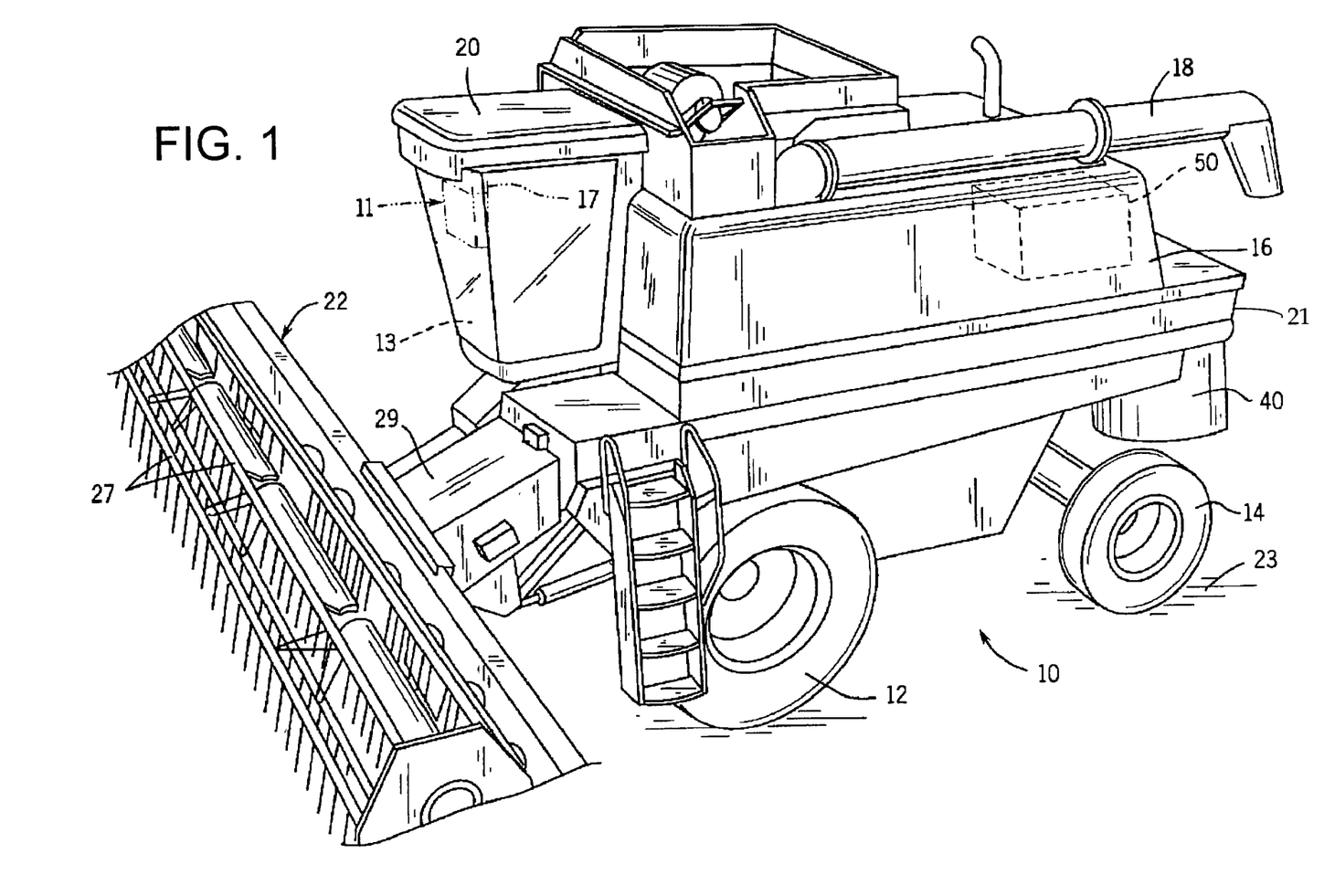
FIG. 1 is a perspective view illustrating an embodiment of an agricultural harvesting vehicle.

As shown in FIG. 1, a work vehicle, namely agricultural vehicle 10, includes a pair of drive wheels 12 located at the front end of vehicle 10, a pair of steerable wheels 14 located at the rear end of vehicle 10, a machinery and grain storage compartment or housing 16, a grain elevator/auger and grain unloading arm or tube 18, an operator cab 20, and a main body support frame or chassis 21 for joining and supporting the above-listed components. Tube 18 is movable between first and second end or terminal positions and to positions therebetween as discussed below.

Attached to a feeder 29 at the front end of the frame of vehicle 10 (i.e., the front-most end of vehicle 10 along its forward direction of travel during harvesting) is a header 22 such as a grain harvesting header. Header 22 is positioned relative to vehicle 10 and/or the surface 23 upon which vehicle 10 is moving. Header 22 includes a reel 27 for gathering the cut crop. The harvested crop is provided to feeder 29 which includes an auger or conveyor mechanism for transporting the harvested crop from header 22 to within vehicle 10. Vehicle 10 includes a straw spreader 40 as shown. Vehicle 10 includes an engine 50 to provide motive power to move vehicle 10 and power to operate the various components included therein, such as straw spreader 40, for example.

Agricultural vehicle 10 includes a control system 11 mounted in an interior 13 of cab 20. Control system 11 is coupled to a display 17 preferably located within interior 13 of cab 20 within view of the operator. Display 17 can also be located on a vertical post within the interior 13 of cab 20. Display 17 is conveniently implemented as a liquid crystal display (LCD), a light emitting diode (LED) array, an incandescent lamp array, a cathode ray tube (CRT), a plasma display or other display devices. Information regarding the status of the various mechanical and electrical systems of vehicle 10 is conveniently provided to the operator on display 17.

Figure 2A:
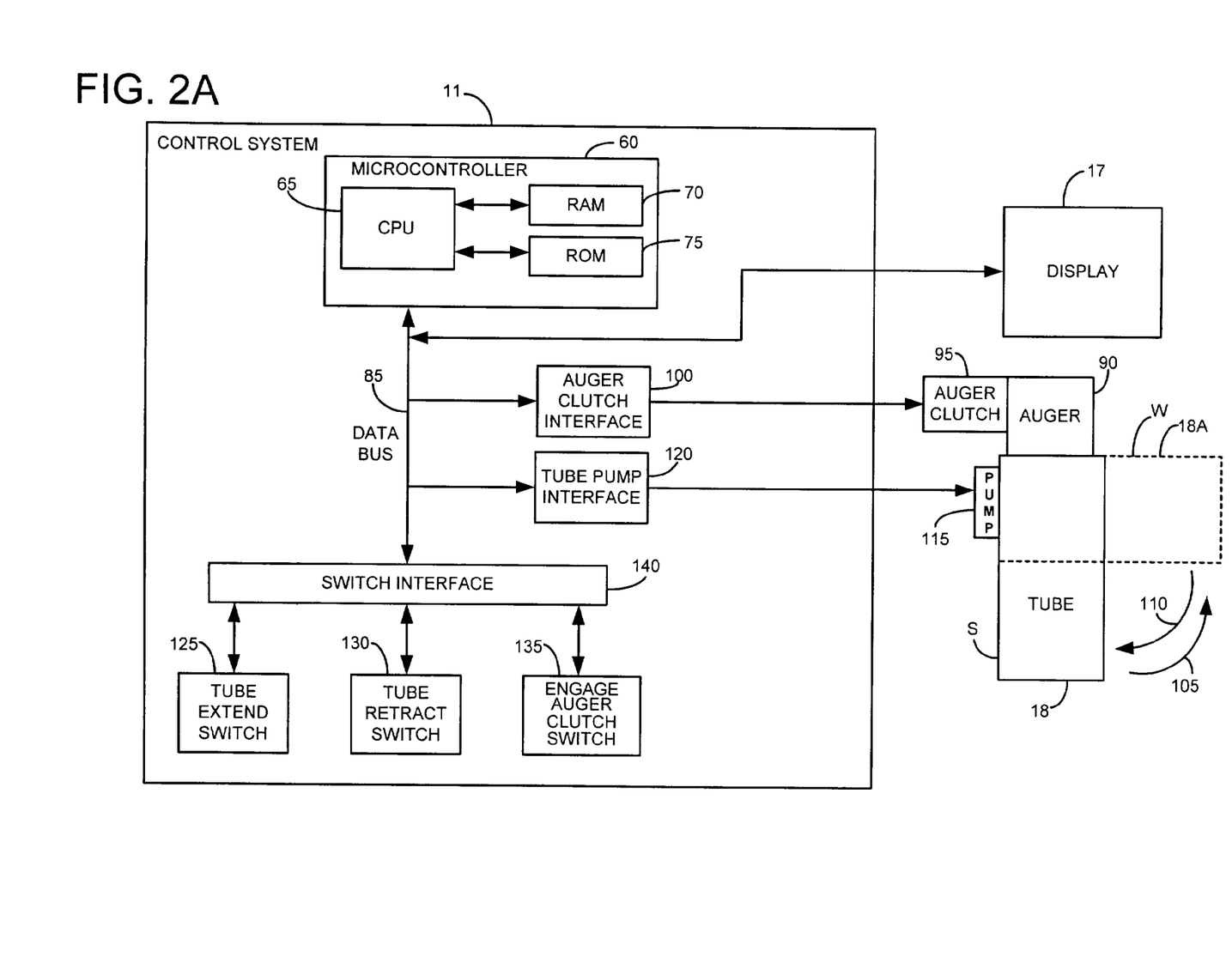
FIG. 2A is a block diagram of the vehicle of FIG. 1 including a control system and loader.

A block diagram of control system 11 is shown in FIG. 2A. This particular implementation of system 11 employs a single microcontroller. However, as discussed later in more detail with respect to FIG. 2B, embodiments of the control system which employ multiple controllers to form a distributed system are possible. Control system 11 of FIG. 2A includes a microcontroller 60 having a central processing unit (CPU) 65 which is coupled to a random access memory (RAM) 70 that provides temporary storage for information. CPU 65 is also coupled to a read only memory (ROM) 75 in which control software is permanently stored. Control software governs the operation of control system 11 as will be discussed later in more detail. Display 17 is coupled to microcontroller 60 so that status and other information can be displayed to the operator.

Control system 11 includes a data bus 85. A tube interface 90 couples movable tube 18 to data bus 85 and microcontroller 60. Tube interface 90 generates appropriate control signals to instruct tube 18 to swing outward or inward at the direction of microcontroller 60 and the control software. An auger 90 or other transport mechanism is situated in tube 18 to cause grain from within work vehicle 10 to be forced into one end of tube 18 and out the other. An auger clutch 95 is mechanically connected to auger 90. Auger clutch 95 is electrically coupled to data 85 by an auger clutch interface 100 as shown. In this manner, under program control, microcontroller 60 can instruct auger clutch 95 to engage such that auger 90 rotates and feeds grain into tube 18. Microcontroller 60 can also instruct auger clutch 90 to disengage such that auger 90 ceases rotation, thus stopping the flow of grain into and through tube 18.

Microcontroller 60 also controls the swinging motion of tube 18 from the stowed position S depicted in solid line in FIG. 2A, to the working position W depicted at 18A (dashed lines) and points therebetween. Arrow 105 depicts the direction of outward rotation of tube 18 and arrow 110 depicts the direction of inward rotation of tube 18 back toward the stowed position. An electrically activated hydraulic pump mechanism 115 is connected to tube 18 to facilitate the inward and outward motion of tube 18 under program control. A tube pump interface couples pump mechanism 115 to data bus 85. Microcontroller 60 is thus coupled to tube 18 to control the inward and outward swinging motion thereof.

Control system 11 includes a tube extend switch 125, a tube retract switch 130 and an enable auger clutch switch 135 which are coupled to data bus 85 and microcontroller 60 by a switch interface 140. As explained in more detail subsequently, the operator presses or touches tube extend switch 125 to cause tube 18 to move outwardly away from the stowed position. The operator presses or touches tube retract switch 130 to cause tube 18 to move inwardly toward the stowed position. The operator can also press or touch engage auger clutch switch 135 to start up auger 90 thus forcing grain into and through tube 18. These actions are conducted under program control as now described.

Figure 2B:
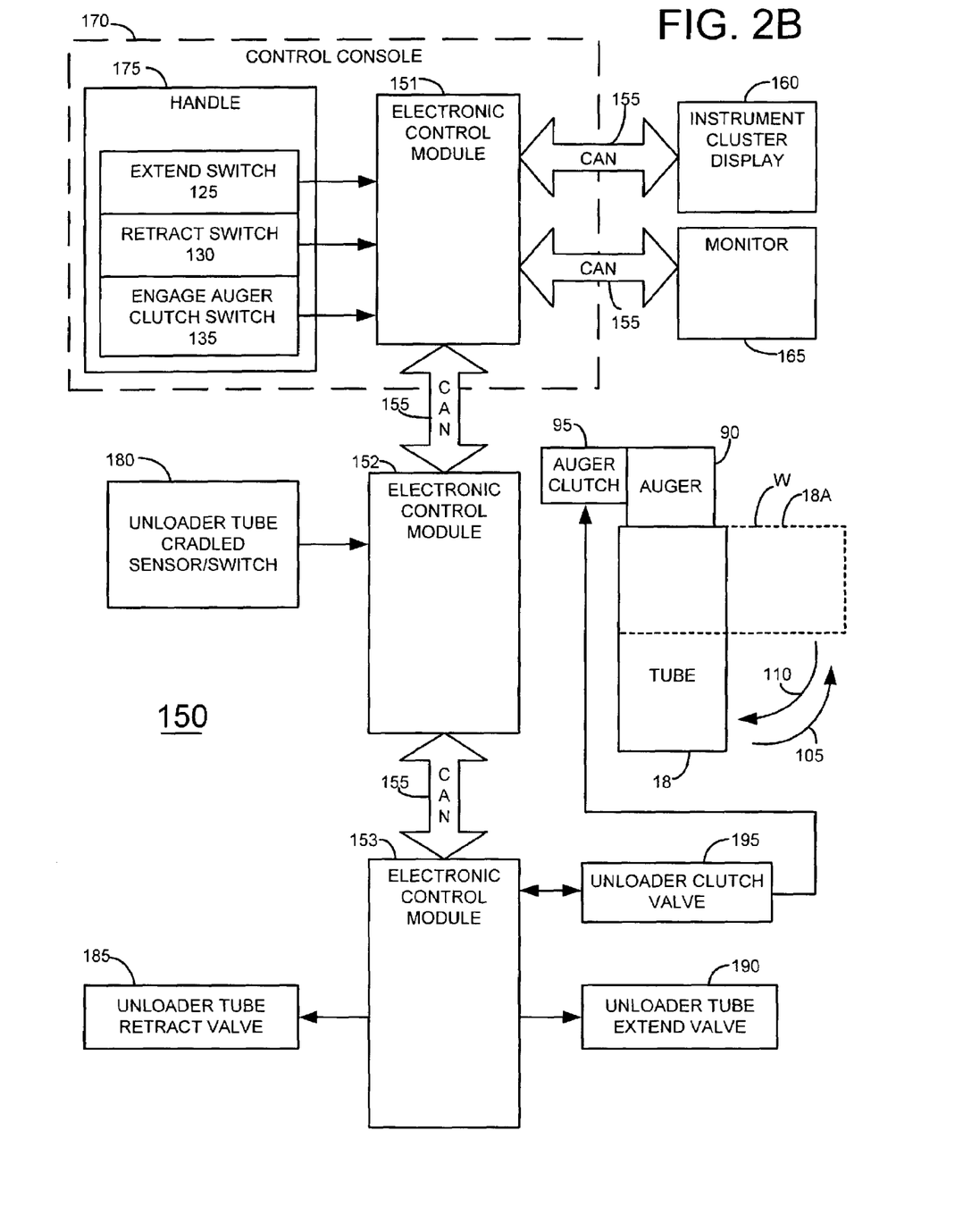
FIG. 2B is a block diagram of another embodiment of the vehicle having multiple controllers in a distributed control system.

While a single microcontroller embodiment of the control system is described above with respect to FIG. 2A, a control system employing multiple controllers in a distributed manner is also contemplated and is shown in FIG. 2B as control system 150. Control system 150 of FIG. 2B includes a number of elements in common with control system 11 of FIG. 2A with like numbers being used to indicate like elements. Control system 150 includes multiple distributed processors, namely electronic control modules 151, 152 and 153 which are implemented by respective microcontrollers. Electronic control modules 151, 152 and 153 are coupled together by controller area network (CAN) 155 as shown so that the modules can communicate with one another. An instrument cluster display 160 including incandescent lights and a video monitor 165 are coupled to control module 151 via CAN 155 as shown to provide status information to the operator in the cab. Also located in the cab is a control console 170 including a control handle on which extend switch 125, retract switch 130 and engage auger clutch switch 135 are situated. Extend switch 125, retract switch 130 and engage auger clutch switch 135 have substantially the same functionality as discussed earlier with respect to FIG. 2B and later in the flowcharts of FIGS. 3 and 4. Control system 150 includes an unloader tube cradled sensor/switch 180 which informs controller 152 when tube 18 is fully retracted into the stowed position. Control system 150 includes an unloader tube retract valve 185 which when activated by control module 153 causes tube 18 to retract or swing inwardly toward the stowed position. Control system 150 also includes an unloader tube extend valve 190 which when activated by control module 153 causes tube 18 to extend or swing outwardly away from the stowed position to a working position. In actual practice, unloader tube retract valve 185 and unloader tube extend valve 190 are located at tube 18 to enable control of the inward and outward swinging motion of tube 18. In addition, control system 150 includes an unloader clutch valve 195 which when activated by control module 153 causes auger clutch 95 to engage to rotate auger 90 causing grain to be transported through tube 18.

Figure 3:
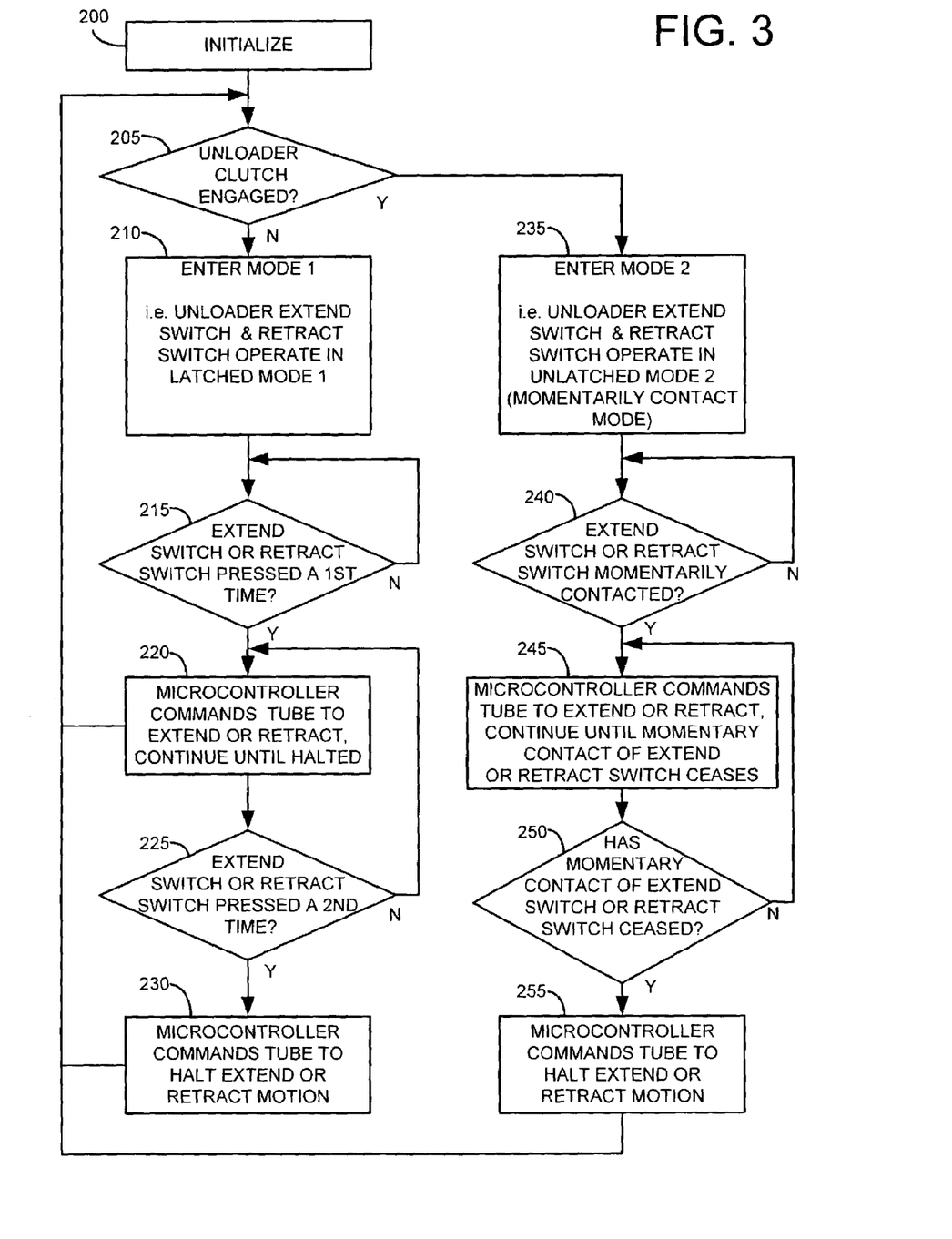
FIG. 3 is a high level flowchart describing the method employed in the operation and control of an unloader apparatus of the vehicle of FIG. 1.
Figure 4:
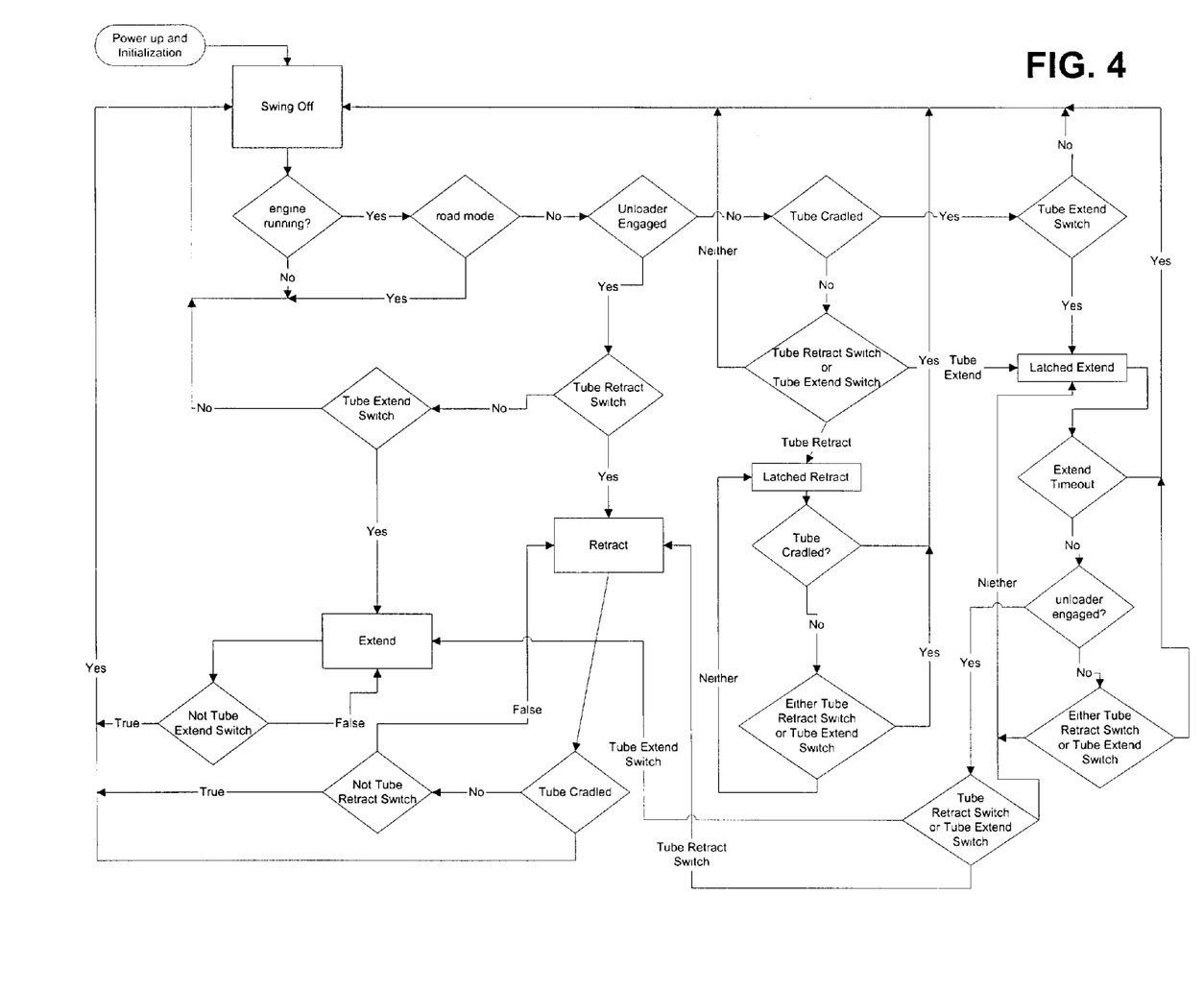
FIG. 4 is a more detailed flowchart describing the method employed in the operation of the vehicle of FIG. 1.

ROM 75 includes the control program or software which governs the operation of work vehicle 10. The flowchart of FIG. 3, as supplemented by FIG. 4, is a simplified flow diagram of one embodiment of program code which can be stored in ROM 75 to achieve the desired functionality. When the operator starts the vehicle, engine 50 commences the production of motive and electrical power thus causing microcontroller 60 to be initialized as per block 200. A test is periodically conducted at decision block 205 to determine if the operator has now engaged auger clutch 95 by touching or pressing engage auger clutch switch 135.

If auger clutch 95 is determined not to be engaged, then process flow continues to block 210 at which control system 11 enters a first mode of operation, namely mode 1. In mode 1, extend switch 125 and retract switch 130 operate as latching switches. In other words, once extend switch 125 is pressed, tube 18 starts extending outwardly away from vehicle 10 and continues extending until switch 125 is pressed a second time or end of travel is reached. If the operator presses retract switch 130, that action would also stop the extend action causing a reverse in direction inwardly, namely a retract action. When the operator presses retract switch 130, retraction commences and continues until the operator presses retract switch 130 a second time or until the stowed position is reached. If the operator presses extend switch 125 while a retraction is underway, that action would also stop the retract action and cause a reversal of direction outwardly.

In more detail, a test is conducted at decision block 215 to determine if the extend switch 125 or the retract switch 130 has been pressed a first time. If not, flow continues back to the input of decision block 215 at which microcontroller 60 waits for the extend or retract switch to be activated by the operator. However, if the extend switch is pressed, microcontroller 60 commands tube 18 to extend by swinging outward as per block 220. A test is conducted at decision block 225 to determine if extend switch 125 is pressed a second time. Tube 18 continues to swing outward until extend switch 125 is pressed a second time or until tube 18 reaches end of travel or retract switch 130 is pressed. When either of these events occur, microcontroller 60 commands tube 18 to stop swinging as per block 230. In an alternate scenario where the operator has pressed retract switch 130 a first time, tube 18 commences swinging inward. Under program control, tube 18 continues to swing inward until retract switch 130 is pressed a second time or the stowed position is reached or extend switch 125 is pressed.

It should be recalled that during this mode 1 operation, auger clutch 90 is not engaged and grain is not flowing through tube 18. Therefore, less than precise positioning of tube 18 over the grain receiving bin (not shown) is acceptable. Much higher precision in the positioning of tube 18 is desired when auger clutch 95 is engaged and feed is flowing from tube 18 into the bin. For this reason, when microcontroller 60 senses that clutch 95 is engaged and grain is flowing as per block 205, microcontroller 60 enters a second more precise mode of operation, namely mode 2 as shown in block 235. Mode 2 is a momentary contact mode wherein tube extend switch 125 and tube retract switch 130 operate in an unlatched fashion.

In more detail, microcontroller 60 monitors to determine if extend switch 125 or retract switch 130 is pressed by the operator as per decision block 240. If microcontroller 60 finds that the operator has momentarily pressed extend switch 125 then microcontroller 60 commands tube 18 to swing outwardly as per block 245. However, microcontroller 60 also monitors to determine when the operator's contact with extend switch 125 ceases as per decision block 250. When the operator ceases touching extend switch 125, then the outward swinging movement of tube 18 ceases as per block 255. If the operator continues pressing extend switch 125, then tube 18 continues to swing outwardly until end of travel is reached or until the operator presses the retract switch 130 which causes tube 18 to reverse its direction of travel and swing inwardly.

In an alternate scenario, during mode 2 operation with the auger spinning and grain flowing, should the operator momentarily press retract switch 130 microcontroller 60 senses this contact at decision block 240 and commands tube 18 to swing inwardly. When microcontroller 60 senses that the operator is no longer pressing retract switch 130 at block 250, then microcontroller 60 commands tube 18 to cease inward swing motion as per block 255.

Advantageously in mode 2 operation, tube 18 momentarily swings outwardly for the duration of the operator's pressing of extend switch 125 and momentarily swings inward for the duration of the operator's pressing of retract switch 130. In this manner, the operator can precisely swing tube 18 back and forth over the bin by alternatingly pressing extend switch 125 and retract switch 130 as many times as desired.

Tube extend switch 125 and tube retract switch 130 can be implemented as separate single pole single throw switches in one embodiment, or can be implemented as a single pole double throw switch or rocker type switch in other embodiments. While conventional toggle switches or pushbutton type switches can be used as switches 125 and 130, a touch sensitive screen may also be employed on display 17 to provide these switching functions.

In summary, the unloader swing control software working together with microcontroller 60 provides unloader swing control that operates in latching mode 1 and non-latching mode 2. Mode 1 operation causes tube extend switch 125 and tube retract switch 130 to act as latching switches. When either switch is pressed and released, unloader tube 18 continues to travel until either switch is pressed a second time or until end of travel is reached. If the operator engages clutch 95 to start up auger 90 while in a latched extend operation in mode 1, the tube will continue to swing outwardly. If after the auger clutch is engaged and the tube is still swinging outwardly and the operator presses either the extend or retract switch, control system 11 switches to mode 2, namely non-latching operation. Thus, because the system is now in mode 2, when the operator releases either the previously pressed extend or retract switch, the tube will stop its inward or outward swinging motion. It is noted that if the system is in mode 1, namely latching mode, and is performing a retract operation, and the operator presses engage auger clutch switch 135, then auger clutch 95 will not engage and the unloader tube 18 will continue to retract until it reaches the stowed position shown in FIG. 1. Under program control, microcontroller 60 displays a message on display 17 to let the operator know that the unloader clutch 95 will not engage because the system is in a latched retract mode 1 operation. As previously discussed, when the auger is spinning, mode 2 operation causes the tube extend and retract switches to act as momentary contact switches. One of the extend or retract switches must be pressed for any unloader tube movement in either direction. When the pressed switch is released, the unloader tube will stop swinging. By alternatingly pressing the extend and retract switches in mode 2, the operator can swing the unloader tube back and forth over the grain receiving bin to effectively "top off" the bin.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in a manner consistent with the scope of the embodiments disclosed herein.

What is claimed is:

1. A work vehicle comprising:
a main body
an unloader member movably mounted on the main body, the unloader member being movable between first and second end positions and to positions therebetween; and
a control system coupled to the unloader member, the control system including a first and second control switch,
the control system being operative in a latched first mode wherein movement of the unloader member in a first direction is started when the first control switch is first actuated and movement is stopped when the first control switch is again actuated, or when the second control switch is first actuated, and
the control system being operative in an unlatched second mode wherein movement of the unloader member is started when the first control switch is actuated to an actuated state and movement stops when the actuated state of the first control switch is removed.

2. The work vehicle of claim 1 wherein the unloader member is swingable between the first and second end positions.

3. The work vehicle of claim 1 wherein the unloader member is a tube for conveying an agricultural product.

4. The work vehicle of claim 1,
the control system being operative in the latched first mode wherein movement of the unloader member is started in a second direction when the second control switch is first actuated and movement is stopped when the second control switch is again actuated, or when the first control switch is actuated after the second control switch is first actuated, and
the control system being operative in the unlatched second mode wherein movement of the unloader member is started in the second direction when the second control switch is actuated to an actuated state and movement stops when the actuated state of the second control switch is removed.

5. The work vehicle of claim 4 wherein the first control switch is an extend switch, actuation of which causes the unloader member to swing outwardly away from the work vehicle.

6. The work vehicle of claim 4 wherein the second control switch is a retract switch, actuation of which causes the unloader member to swing inwardly toward the work vehicle.

7. The work vehicle of claim 1 wherein the first end position is a stowed position for storing the unloader member.

8. The work vehicle of claim 1 wherein the second end position is an extended position.

9. The work vehicle of claim 1 further comprising an auger clutch coupled to an auger for conveying an agricultural product into the unloader member.

10. The work vehicle of claim 9 further comprising a third control switch for actuating the auger clutch to engage the auger clutch for conveying an agricultural product to the unloader member.

11. The work vehicle of claim 9, wherein the control system operates in the unlatched second mode when the clutch is engaged.

12. The work vehicle of claim 9, wherein the control system operates in the latched first mode when the clutch is disengaged.

13. The work vehicle of claim 1 wherein the vehicle is configured as a combine.

14. An agricultural harvesting machine comprising:
a chassis;
an unloader member movably mounted on the chassis and movable between first and second terminal positions and to positions therebetween;
an operator station on the chassis;
a control system operable from the operator station, the control system coupled to the unloader member and including a first and second control switch,
the control system being operative in a latched first mode wherein movement of the unloader member in a first direction is started in response to the first control switch being first actuated and movement is stopped in response to the first control switch being again actuated, or when the second control switch is first actuated, and
the control system being operative in an unlatched second mode wherein movement of the unloader member is started in response to the first control switch being actuated to an actuated state and movement stops in response to the actuated state of the first control switch being removed.

15. The harvesting machine of claim 14,
the control system being operative in the latched first mode wherein movement of the unloader member is started in a second direction in response to the second control switch being first actuated and movement is stopped in response to the second control switch being again actuated, or when the first control switch is actuated after the second control switch is first actuated, and
the control system being operative in the unlatched second mode wherein movement of the unloader member is started in the second direction in response to the second control switch being actuated to an actuated state and movement stops in response to removal of the actuated state of the second control switch.

16. The harvesting machine of claim 15 wherein the chassis is powered to move and unload harvested material and simultaneously position the unloader member for even distribution of the harvested material.

17. A method of conveying product from a work vehicle through a positionable conveyor, the work vehicle including a main body propelled by a power source, the method comprising:
providing an unloader member movably mounted to the main body, the unloader member being movable between first and second end positions and to positions therebetween; and
providing a control system coupled to the unloader member, the control system including a first and second control switch,
the control system being operative in a latched first mode wherein movement of the unloader member in a first direction is started when the first control switch is first actuated and movement is stopped when the first control switch is again actuated, or when the second control switch is first actuated, and
the control system being operative in an unlatched second mode wherein movement of the unloader member is started when the first control switch is actuated to an actuated state and movement stops when the actuated state of the first control switch is removed.

18. The method of claim 17 further comprising configuring the vehicle as a combine.

19. The method of claim 17 further comprising swinging the unloader ember between the first and second end positions and positions therebetween in response to operator input.

20. The method of claim 17 further comprising activating actuating the first control switch to cause the unloader member to swing outwardly away from the work vehicle.

21. The method of claim 17 further comprising,
   operating the control system in the latched first mode wherein movement of the unloader member is started in a second direction when the second control switch is first actuated and movement is stopped when the second control switch is again actuated, or when the first control switch is actuated after the second control switch is first actuated, and
   operating the control system in the unlatched second mode wherein movement of the unloader member is started in the second direction when the second control switch is actuated to an actuated state and movement stops when the actuated state of the second control switch is removed.

22. The method of claim 17 wherein the first direction is outwardly away from the work vehicle.

23. The method of claim 17 wherein the second direction is inwardly toward the work vehicle.

* * * * *